(12) United States Patent
Jurowicz et al.

(10) Patent No.: US 11,048,688 B2
(45) Date of Patent: *Jun. 29, 2021

(54) DELETING CONFIGURATION ITEMS IN A CONFIGURATION MANAGEMENT DATABASE

(71) Applicant: International Business Machines Corporation, Armonk, NY (US)

(72) Inventors: Jaroslaw Jurowicz, Cracow (PL); Tomasz P. Kania, Tarnów (PL); Ewa K. Kilar, Cracow (PL); Andrzej W. Laskawiec, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 361 days.

This patent is subject to a terminal disclaimer.

(21) Appl. No.: 16/005,802

(22) Filed: Jun. 12, 2018

(65) Prior Publication Data

US 2018/0293271 A1    Oct. 11, 2018

Related U.S. Application Data

(63) Continuation of application No. 14/797,355, filed on Jul. 13, 2015, now Pat. No. 10,025,815.

(51) Int. Cl.
*G06F 16/23* (2019.01)
*G06F 16/215* (2019.01)
*G06F 16/21* (2019.01)
*G06F 16/901* (2019.01)

(52) U.S. Cl.
CPC ........ *G06F 16/2379* (2019.01); *G06F 16/215* (2019.01); *G06F 16/219* (2019.01); *G06F 16/2365* (2019.01); *G06F 16/9024* (2019.01)

(58) Field of Classification Search
CPC .. G06F 16/2379; G06F 16/219; G06F 16/215; G06F 16/2365; G06F 16/9024
USPC ........................................................ 707/689
See application file for complete search history.

(56) References Cited

U.S. PATENT DOCUMENTS

| 7,467,126 B2 | 12/2008 | Smith et al. |
| 8,639,798 B2 | 1/2014 | Akiyama et al. |
| 9,317,539 B2 * | 4/2016 | Sato .................... G06F 11/3419 |
| 2007/0100892 A1 * | 5/2007 | Kephart ................ G06Q 10/06 |

(Continued)

FOREIGN PATENT DOCUMENTS

CN            101556589 A      10/2009

OTHER PUBLICATIONS

Appendix P—List of IBM Patents or Patent Applications Treated as Related, Filed herewith, 2 Pages.

*Primary Examiner* — Joshua Bullock
(74) *Attorney, Agent, or Firm* — Alexa L. Ashworth; Brian M. Restauro (57) ABSTRACT

Embodiments of the present invention provide automated systems and methods for selectively finding and deleting dormant data (out of data, inactive data) in a configuration management database (CMDB), or in a database which has similar characteristics. The method includes using a directed graph where each node of the directed graph represents a configuration item, and traversing the directed graph in order to determine inactive or dormant data, and all of the objects which depend on that data. Configuration items are deleted only when all of the other configuration items from which it depends contain dormant data.

20 Claims, 4 Drawing Sheets

(56) References Cited

U.S. PATENT DOCUMENTS

| | | | |
|---|---|---|---|
| 2011/0246541 A1* | 10/2011 | Sakai | H04L 43/0817 |
| | | | 707/812 |
| 2012/0215819 A1 | 8/2012 | Gowdra | |
| 2013/0262380 A1* | 10/2013 | Matsuda | H04L 41/024 |
| | | | 707/625 |
| 2013/0268499 A1* | 10/2013 | Kirihata | G06F 16/90 |
| | | | 707/692 |
| 2014/0095448 A1 | 4/2014 | Marwah et al. | |
| 2014/0149466 A1* | 5/2014 | Sato | G06F 11/3419 |
| | | | 707/803 |
| 2014/0297636 A1* | 10/2014 | Kitajima | G06F 16/23 |
| | | | 707/736 |
| 2015/0280981 A1* | 10/2015 | Sasada | H04L 41/0853 |
| | | | 709/222 |
| 2017/0017679 A1 | 1/2017 | Jurowicz et al. | |

\* cited by examiner

DELETING CONFIGURATION ITEMS IN A CONFIGURATION MANAGEMENT DATABASE

BACKGROUND OF THE INVENTION

The present invention relates generally to the field of configuration management databases (CMDBs) and more particularly to deleting configuration items stored therein.

Configuration management databases (CMDBs) are commonly used to track the status and availability of physical and virtual resources in an IT-infrastructure or network. Such resources can be, for example, computers, printers, routers, and network connections. Configuration information of said resources is stored in the form of so called "configuration items (CIs)" in the CMDB. The CIs of the resources are updated regularly in order to reflect the current status of the resources. Conventional implementations of CMDBs thus tend to be often overfilled with data. This may lead to increased storage consumption and migration times, and prolonged response times of the CMDB.

SUMMARY

According to one embodiment of the present invention, a method for operating a configuration management database (CMDB) is provided, the method comprising: for a configuration item in a configuration management database (CMDB), responsive to updating the configuration item, determining, by one or more processors, a last update time associated with the updated configuration item; receiving, by one or more processors, an indication to delete a configuration item; responsive to receiving the indication to delete the configuration item, determining, by one or more processors, whether an age of the configuration item is greater than a threshold, wherein the threshold comprises a difference between a current time and the last update time; responsive to determining that the age of the configuration item is greater than the threshold, assigning, by one or more processors, the configuration item a deletion-candidate label; identifying, by one or more processors, a set of configuration items associated with a set of nodes of a directed graph, wherein the set of nodes of the directed graph are assigned the deletion-candidate label; and deleting, by one or more processors, the set of identified configuration items assigned the deletion-candidate label.

Another embodiment of the present invention provides a computer program product for operating a configuration management database, the computer program product comprising: a computer readable storage medium and program instructions stored on the computer readable storage medium, the program instructions comprising: for a configuration item in a configuration management database (CMDB), program instructions to, responsive to updating the configuration item, determine a last update time associated with the updated configuration item; program instructions to receive an indication to delete a configuration item; program instructions to, responsive to receiving the indication to delete the configuration item, determine whether an age of the configuration item is greater than a threshold, wherein the threshold comprises a difference between a current time and the last update time; program instructions to, responsive to determining that the age of the configuration item is greater than the threshold, assign the configuration item a deletion-candidate label; program instruction to identify a set of configuration items associated with a set of nodes of a directed graph, wherein the set of nodes of the directed graph are assigned the deletion-candidate label; and program instructions to delete the set of identified configuration items assigned the deletion-candidate label.

Another embodiment of the present invention provides a configuration management database, the configuration management database comprising: a plurality of configuration items, wherein each of the plurality of configuration items comprises configuration data for a module, and wherein the module comprises at least one of: a hardware module, a firmware module, and a software module; for a configuration item in a configuration management database (CMDB), program instructions to, responsive to updating the configuration item, determine a last update time associated with the updated configuration item; program instructions to receive an indication to delete a configuration item; program instructions to, responsive to receiving the indication to delete the configuration item, determine whether an age of the configuration item is greater than a threshold, wherein the threshold comprises a difference between a current time and the last update time; program instructions to, responsive to determining that the age of the configuration item is greater than the threshold, assign the configuration item a deletion-candidate label; program instruction to identify a set of configuration items associated with a set of nodes of a directed graph, wherein the set of nodes of the directed graph are assigned the deletion-candidate label; and program instructions to delete the set of identified configuration items assigned the deletion-candidate label.

DETAILED DESCRIPTION

Embodiments of the present invention provide systems and methods for selectively deleting configuration items. In this manner, the method and systems provide that the CMDB does not consume too much storage space and/or can be migrated quickly without causing too much network traffic. Embodiments of the present invention provide systems and methods which allow for deleting outdated CIs without creating inconsistencies within the CMDB.

A "hardware, firmware and/or software module" as used herein is a functional and/or physical unit that is configured for providing a function and for acting as a source for configuration data, the configuration data being indicative of the current status of said module and/or of configuration information related to said module. For example, a module could be a hardware- and/or firmware module such as a server computer, a router, a splitter, a storage medium, or the like. Likewise, a module could be a software module such as a virtualization platform, an application server application, a web server application, a database management system application, a web application hosted by a web server application, any other kind of application program, an operating system (OS), or the like.

A "graph" is a data structure comprising a set of nodes where some pairs of nodes are connected by edges. A "tree" is a connected graph with no cycles. A "node", also referred to as "vertex", is a data object representing one of the two fundamental element types of a graph. An "edge" is a data object representing the other fundamental element type of a graph. A "path" in a graph is a sequence of vertices that are connected by edges.

A "child node" as used herein is a node that descends from another node, referred herein as direct parent node. The child node represents a configuration item and associated "child" module, the other node represents a configuration item and associated "direct parent" module, whereby preferentially the direct parent module physically and/or logically depends on all its direct and indirect "child modules". A physical and/or logical dependency between modules may imply, for example, that the dependent module can only be installed, instantiated, or used if all the modules from which it depends were already installed and/or instantiated.

Embodiments of the present invention may provide for a CMDB and corresponding storage medium and method of operating said CMDB which may allow deleting outdated CIs without creating inconsistencies within the CMDB. In the case a particular module, referred herein as "isolated module", is available and fully operational and only the data connection between the CMDB and said module is interrupted, the CI of said "isolated module" will become outdated after a while due to the broken data connection. An automated deletion of the "outdated" CI of said module in the CMDB would result in a situation where the database management system (DBMS) comprises CIs of modules depending on said particular "isolated module" (because the data connection between the CMDB and said dependent modules may work correctly and the CIs of said dependent modules are updated regularly) although the CI of said "isolated module" was deleted. Thus, instead of using a "simple" deletion schema, only those nodes are deleted which have been assigned the deletion-candidate label ("deletion candidate nodes") and which in addition fulfill the condition that all their direct and indirect parent nodes have been assigned the deletion-candidate label (are also "deletion candidate nodes"). Thus, if only a single node exists which is a direct or indirect parent node of said "deletion candidate node", said "deletion candidate" node will not be deleted. This may be advantageous as the deletion of CIs of modules may be prohibited which are fully operative but from which no recent configuration data may have been received, e.g., due to a broken data connection. In case a particular module would indeed not be operational, then all other modules which depend from it would also not be operational. As a result, all direct and indirect parent nodes of the node receiving its configuration data from said particular module would have assigned the "deletion candidate label" after a while and the particular node and its direct and indirect parent nodes would be deleted.

Figure 1:
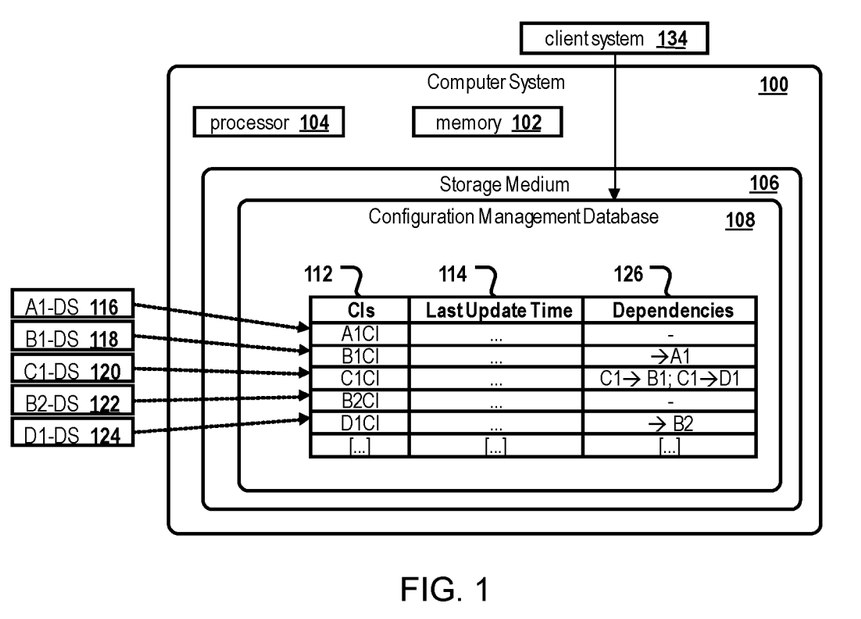
FIG. 1 depicts a block diagram of a computer system hosting a CMDB, in accordance with an embodiment of the present invention.

FIG. 1 depicts a block diagram of computer system 100, hosting CMDB 108, in accordance with an embodiment of the present invention.

Computer system 100 is connected to one or more client systems 134. A client system can be, for example, a desktop computer system, a notebook, a tablet computer, a battery-powered cellular phone and the like. Computer system 100 includes one or more processors 104 and a main memory 102. Computer system 100 includes a storage medium 106 comprising a configuration management database (CMDB) 108.

Configuration management database 108 includes one or more database tables having stored a plurality of configuration items 112 and information on the dependencies 126 of CIs 112. Configuration management database (CMDB) 108 is a database management system comprising a database that contains configuration data of a plurality of hardware, firmware and/or software modules, which act as data sources for CMDB 108. According to preferred embodiments, CMDB 108 includes the configuration data in the form of a plurality of configuration items (CIs) 112, whereby each CI 112 includes configuration data and configuration metadata. Configuration metadata may be, for example, a time stamp being indicative of the moment in time when the configuration data was stored in CMDB 108, the location and/or status of the module to which the CI is assigned, the interconnectivity and interdependence of a module with other hardware, firmware and software modules, and optionally also the interconnectivity and interdependence of the CIs associated with the modules. According to an embodiment of the present invention, CMDB 108 is used to automatically ensure an appropriate order of installing or instantiating a plurality of modules within an organizations' IT environment to avoid conflicts, inconsistencies, and errors.

In some embodiments, CMDB 108 receives configuration data from a provider unit (not pictured) of one of the modules. A "provider unit" or "provider" as used herein is a piece of software logic that autonomously and fully automatically collects configuration data from one or more of the modules, optionally processes said configuration data, e.g., to bring the data into a format interpretable by CMDB 108, and forwards the original or processed configuration data to CMDB 108. Preferentially, there exists one provider unit per module. Usually, the provider modules are part of an IT-system managed by CMDB 108, not part of CMDB 108. Then, CMDB 108 identifies one of the configuration items assigned to said module and stores the received configuration data in the identified configuration item, thereby performing the updating, or an initial storing, of the configuration item.

Using providers may have the benefit that any kind of hardware, firmware, and software module may be used as a data source for providing the configuration data of a respective configuration item stored in CMDB 108. The providers will ensure that the configuration data of different modules follow the same syntax of format. However, sometimes a provider may not be able to collect data from a module acting as the data source, even if the module started correctly and is fully operative. For example, the data connection between a module and its provider may be interrupted, or the provider may not work properly. In this case, the CI of the affected module will not be updated regularly with current configuration data and will be marked as a deletion-candidate node.

CIs 112 are data structures including information on the status and/or the configuration of a hardware-, firmware-, or software module at a particular moment in time. In this exemplary embodiment, CI 112 of any one of said modules is used and is designated for configuration management of said module and optionally of other modules which depend on it. CI 112 can include status information, requirements, code, documents, and/or models of its respective module and of its dependent modules. In one embodiment of the present invention, at least one of the modules is one of: a hypervisor (i.e., a program that allows for the hosting of several different virtual machines on a single hardware); a virtual machine (i.e., a program that acts as a virtual computer); an operating system; an application program; a web server program or an application server program; a router; a network interface; a firewall. This may be beneficial as a highly complex, heterogeneous, and strongly internally interconnected IT-environment may be automatically monitored and/or managed by means of CMDB 108 according to embodiments of the invention, whereby a cluttering of CMDB 108 with outdated CI 112 versions is prohibited without causing inconsistencies. The creation of inconsistencies may be resolved by deleting a deletion-candidate node, when all of the node's dependent nodes also have been assigned a deletion-candidate label.

In other embodiments, CIs 112 are used by a configuration management server to monitor and/or manage the respective modules through processes and tools to avoid an introduction of errors relating to the concurrent instantiation of incompatible modules or relating to the instantiation or installation of a module at a moment in time when other modules from which said module depends are not yet available. CI 112 can comprise configurable attributes, e.g. technical attributes, ownership attributes, relationship attributes, and the like.

Each CI 112 of FIG. 1, e.g. A1CI, B1CI, B2CI, . . . is assigned a last update time 114. The last update time is a time stamp indicating the most recent moment in time when said data item was stored or updated. Each CI 112 is assigned a hardware, firmware, or software module 116-124, acting as a source of configuration data to be stored as a configuration item 112 or part thereof in CMDB 108. For example, module 116 acts as a data source for configuration item A1CI; module 118 acts as a data source for configuration item B1CI, software module 120 acts as a data source for configuration item C1CI, and so on. The configuration data of each module 116-124 may be provided via a respective provider unit (not shown) and a respective communication channel, e.g., a session bound network connection between a module and CMDB 108. In some embodiments, one provider unit is responsible for regularly communicating the configuration data of multiple modules.

The configuration data of the respective modules 116-124 is transferred to CMDB 108 asynchronously, which means that the question if and when a particular module 116-124 provides its configuration data to CMDB 108 is independent from the status and behavior of any one of the other modules 116-124, and does not depend on the time when any one of the other modules 116-124 provides current configuration data to CMDB 108. For example, module 116 may send status information and current configuration data every three minutes to CMDB 108, where it is stored in a respective CI 112 in association with a current time stamp. Module 118 may send status information and current configuration data every five minutes to CMDB 108, and so on. According to some embodiments of the present invention, each time current configuration data is received by CMDB 108 from a respective module 116-124, the previously received configuration data of that module is overwritten, and the associated last update time 114 is updated. In other embodiments, a current CI 112 of a module 116-124 is stored in addition to one or more previously stored CIs 112 of said module, whereby the number of previously stored CI 112 versions may in some example embodiments be limited by the CMDB 108 by regularly performing an automated delete operation as described herein.

Figure 4:
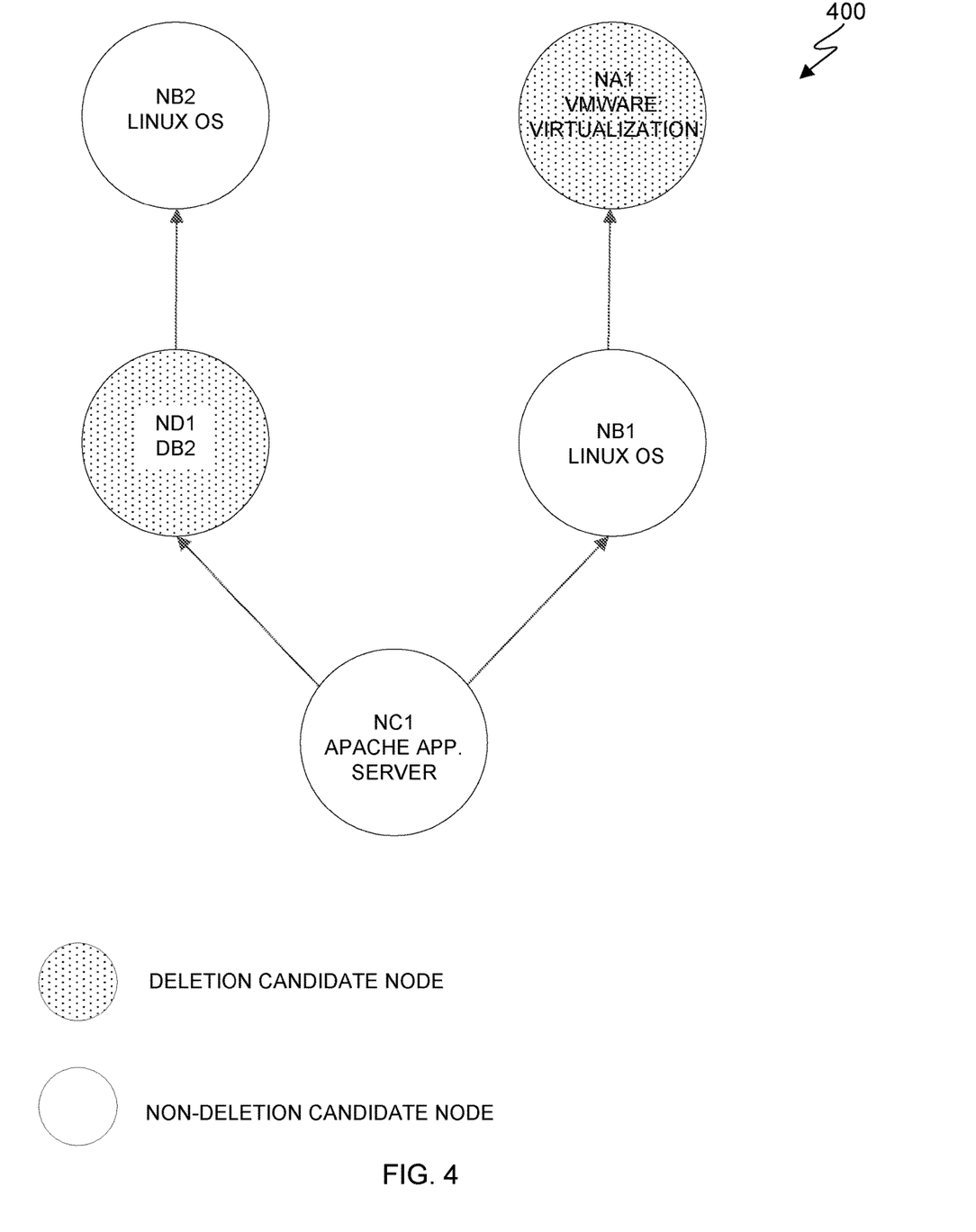
FIG. 4 depicts a directed graph of interconnected configuration items comprising configuration data of interdependent hardware, firmware, and software modules, in accordance with an embodiment of the present invention.

Dependencies 126 reflect the dependencies of the hardware, firmware, or software modules 116-124 acting as data sources for the respective configuration items 112. Dependencies 126 can be specified in the form of directed edges of a connected graph (described in further detail below). In this exemplary embodiment, dependencies 126 are automatically extracted by CMDB 108, or a plug-in, by analyzing the configuration data contained in CIs 112. For example, CIs 112 may include information on the type of module from which their respective configuration data was derived and/or may comprise information on relationships between said modules. CMDB 108 or a plug-in thereof may automatically evaluate the module-type and/or relationship information contained in CIs 112, extract dependencies 126, and may automatically create a connected graph with directed edges, whereby the direction of the edges reflects the dependencies of the modules, and whereby the edges connect nodes which respectively represent one of the CIs 112. An example for such a graph with directed edges is depicted in FIG. 4.

After having removed the identified CIs 112, a graphical representation of the graph of the CIs 112 and respective modules 116-124 is created and communicated via a network to client system 134.

Figure 2:
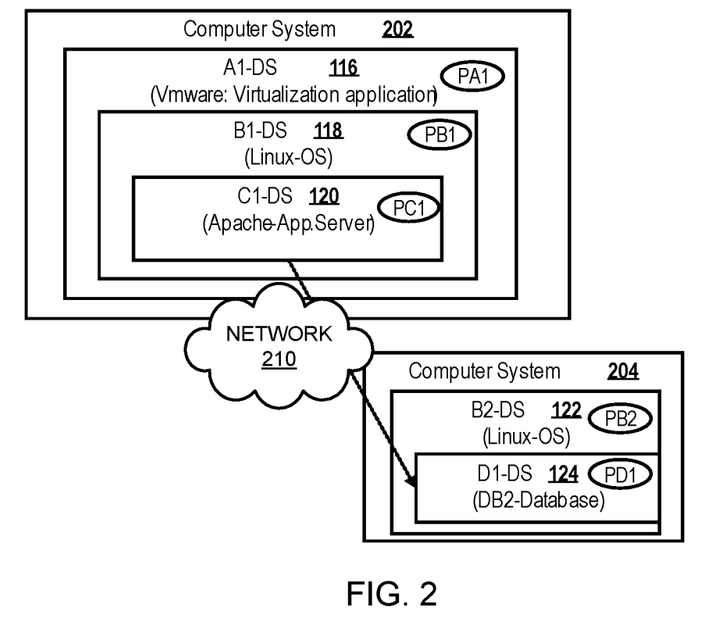
FIG. 2 depicts a block diagram of a distributed computer system comprising hardware, firmware, and/or software modules acting as sources of configuration data for the respective configuration items depicted in FIG. 1, in accordance with an embodiment of the present invention.

FIG. 2 depicts a block diagram of a distributed computer system comprising hardware, firmware, and/or software modules acting as sources of configuration data for the respective configuration items 112 depicted in FIG. 1, in accordance with an embodiment of the present invention.

In this exemplary embodiment, computer system 202 includes an installed module 116, which may be, for example, a VMware application which allows for installing a plurality of virtual machines on the same computer system 202.

In this exemplary embodiment, one of the virtual machines having been installed on the virtualization application module 116 is a virtual machine operating with a Linux operating system (OS) 118.

In this exemplary embodiment, software module 120, which is the configuration data source for configuration item C1CI of FIG. 1, runs on the Linux operating system module 118. Said software module 120 may be an application server, e.g., the Apache application server. The Apache application server may require access to a particular database 124 in order to be fully operative. That database can be, for example, a DB2 database which is a data source for a respective configuration item D1CI (of FIG. 1) of CMDB 108. Database 124 is installed on another instance of the Linux operating system 122, whereby Linux operating system 122 is a software module acting as a data source for configuration item B2CI.

In the example IT infrastructure depicted in FIG. 2, Linux operating system 122 is installed on a separate computer system 204 connected via network 210 connection to computer system 202. However, many other kinds of system architectures, system components, and respective dependencies may be implemented. For example, the second instance of Linux operating system 122 can also have been installed on the virtualization application module 116 on the same computer system 202, similarly to the other instance of Linux operating system module 118. The system architecture depicted in FIG. 2 reflects dependencies between different modules. For example, the Apache application server (i.e., software module 120) can only be installed and instantiated after Linux operating system module 118 has been installed and instantiated. Linux operating system module 118, again, can only be installed after virtualization application module 116 is successfully installed and instantiated on computer system 202. In the case of a hardware failure of computer system 202, all dependent modules (i.e., 116, 118, 120) will stop operating properly and will stop transmitting current status information and/or configuration data to CMDB 108.

Figure 3:
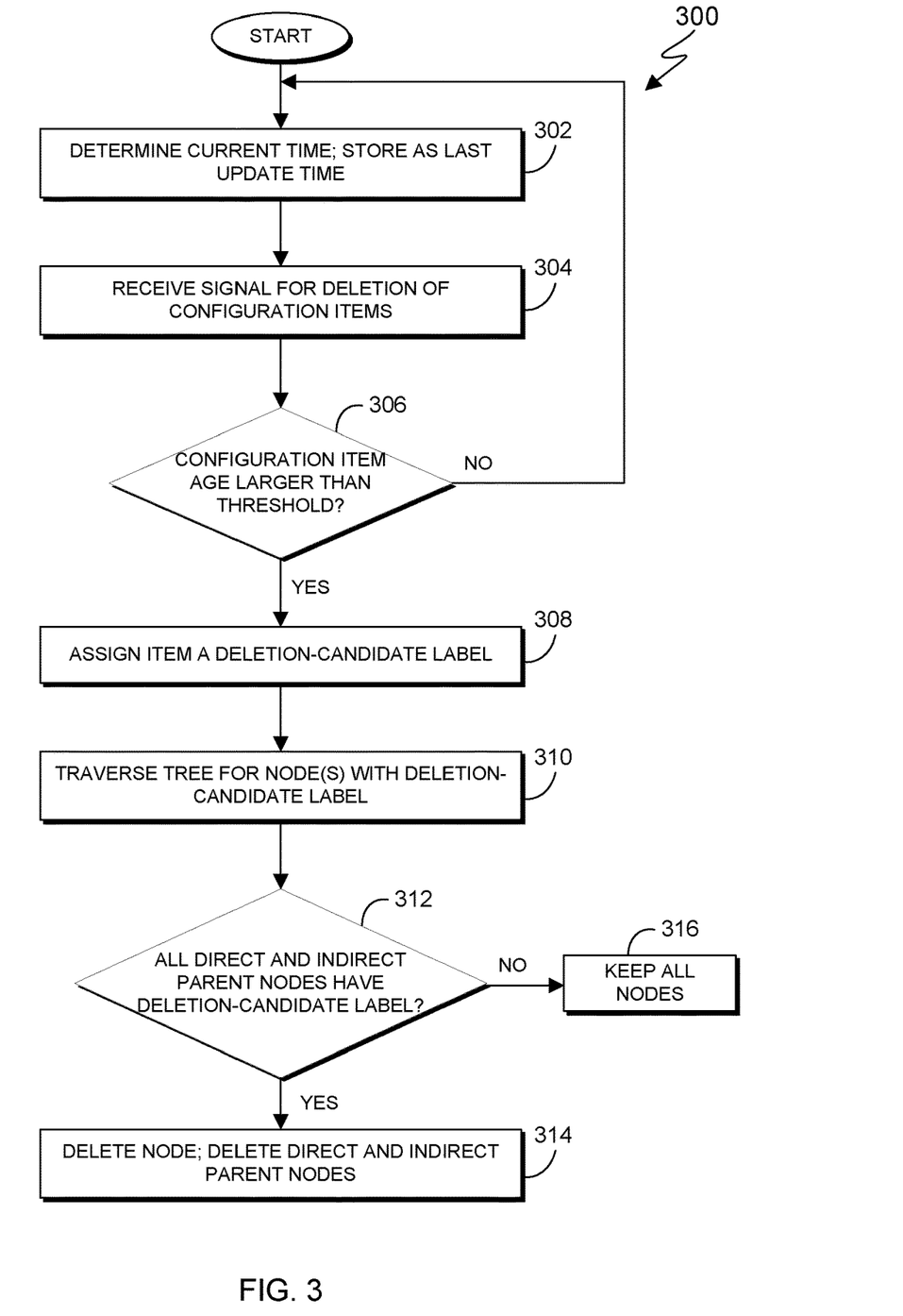
FIG. 3 depicts a flowchart illustrating operational steps for finding dormant data in a configuration management database (CMDB), in accordance with an embodiment of the present invention.

FIG. 3 depicts a flowchart 300 illustrating operational steps for finding dormant data in configuration management database (CMDB) 108, in accordance with an embodiment of the present invention. The operational steps of FIG. 3 may be performed by CMDB 108 alone, or in combination with a plugin.

In step 302, CMDB 108 determines a current time for all configuration items 112 in CMDB 108, and stores the current time as the last update time. Whenever a configuration item 112 is stored for the first time or updated in CMDB 108, a current time is determined and stored as last update time 114 in association with that configuration item in CMDB 108. In some embodiments, CMDB 108 repeatedly receives current configuration data from each of the modules. The receiving of the configuration data from any one of the modules is independent from whether and when configuration data of any other modules is received. In response to receiving the current configuration data, the corresponding configuration items are updated, comprising the configuration data for the module from which the current configuration data was received, thereby also updating the last update time 114 of said configuration item.

In step 304, CMDB 108 receives a signal for the deletion of any outdated configuration items from the database. CMDB 108 may receive a trigger signal for deleting all outdated configuration items from the database. In response to receiving such a trigger signal, e.g., from a cron job, the CMDB 108 automatically determines a current time, referred to as a "delete-trigger time", and computes the age of each of the configuration items 112 by calculating the difference between the delete-trigger time and the last update time 114 of said configuration item. A trigger signal can be any signal that is capable of triggering an evaluation as to which of CIs 112 should be labeled as a deletion-candidate, and optionally should be deleted if further conditions are fulfilled. In some embodiments of the present invention, a trigger signal is a user-action, e.g., a user command entered via a command line or graphical user interface for performing a delete action on outdated CIs. In addition, or alternatively, the trigger signal may be emitted by a regularly executed process, e.g., a background process such as a cron job, which is used for regularly scanning (e.g., every once in an hour or once per day), and determines if CMDB 108 comprises outdated CIs 112, which can safely be deleted.

In step 306, CMDB 108 determines whether the configuration item 112 age is larger than a threshold. In this exemplary embodiment, a cron daemon (not shown in FIG. 1) regularly checks, e.g., every 10 hours, if CMDB 108 includes any CIs 112 older than a predefined age threshold, e.g., 10 hours. The age threshold may be user-configurable. CMDB 108, or any other program logic coupled with CMDB 108, compares the computed age of the configuration items 112 with a predefined age threshold. In other embodiments, the checking can be executed in response to any other event (e.g., deletion trigger signal) that triggers an evaluation of the age of CIs 112. Such an event may be, for example, a user request, a request of an external application program, or the like. According to one example implementation, the configuration data is received by the CMDB 108 from a plurality of modules on a regular basis, e.g., from module A once every 5 minutes and from module B once every 15 minutes. The threshold age used for identifying deletion-candidate nodes, i.e., nodes to be assigned a deletion-candidate label, may be 5 hours in this example. According to another example implementation, the CMDB 108 receives configuration data of module A every hour, from module B every three hours, and the threshold age is 30 hours. In addition, in some embodiments, a user or another application program may trigger the provision of configuration data of all the modules managed or monitored by CMDB 108 to CMDB 108.

If in step 306, CMDB 108 determines that the configuration item age is larger than the threshold, then, in step 308, CMDB 108 assigns a deletion-candidate label to each configuration item 112 whose age is larger than the threshold age. In this exemplary embodiment, a deletion-candidate label is a piece of information, e.g., metadata, which may be assigned to a node to indicate that its configuration data is outdated. The labeling of a node with a deletion-candidate label does not automatically imply that the node will be deleted. The assignment of the deletion-candidate label may be implemented, for example, by means of a database record in a separate table, by a "label" column of a database table comprising the configuration items, by metadata assigned to node data objects of a graph, or the like. Assigning a deletion-candidate label to all direct and indirect parent nodes of a particular node means that all nodes which are connected to said particular node via one edge (i.e., "directly") or via two or more edges (i.e., "indirectly") have been assigned the deletion-candidate label, wherein the connecting edges have a direction that indicates and determines which one of two connected nodes is the parent and which node is the child.

If in step 306, CMDB 108 determines that the configuration item age is not larger than the threshold, then CMDB 108 continues to monitor for a current time for all configuration items 112 in CMDB 108, and stores the current time as the last update time (i.e., step 302).

In step 310, CMDB 108 traverses the tree for node(s) with a deletion-candidate label. In this exemplary embodiment, after having evaluated the age and optionally labeled all configuration items in the CMDB 108, a directed graph which reflects the physical and/or logical dependencies of the modules 116-124, acting as the configuration data sources of the respective configuration items and nodes, is traversed in order to determine if all direct and indirect child nodes of a particular node also have been assigned a deletion-candidate label. In some embodiments, the directed graph is, or comprises, a tree and the configuration items contained in said tree form a partially ordered set via the tree. Using a tree structure may be advantageous as the sort order of a tree data structure may allow for a particularly efficient traversal of all nodes being contained in said tree. In another embodiment, the tree, and optionally further trees, may be automatically extracted from the graph by automatically resolving, e.g., by the CMDB 108 or a plug-in, the cyclic dependencies in the graph.

In this exemplary embodiment, traversing of the tree comprises: selecting one or more of the nodes having been assigned the "deletion candidate label" as starting nodes and for each of the starting nodes, traversing the tree upwards (i.e., from child to parent) by repeatedly selecting and evaluating the parent node of each currently evaluated node, thereby automatically determining if the currently evaluated node has been assigned a deletion-candidate label.

The tree traversal approach may be beneficial, as a highly efficient tree traversal approach in the present context may be provided: the upward-traversal for a currently selected starting node which has been assigned a deletion-candidate label may be more efficient than e.g., evaluating the status of all parent nodes irrespective of the presence of a deletion candidate label, because this implies that in many situations only a subset of all nodes of a graph have to be evaluated. In this exemplary embodiment, the upward-traversal for said starting node is immediately stopped upon reaching a node not being a deletion-candidate (i.e., not having been assigned a deletion-candidate label). This may save processing resources. It may be possible that a parent node of the node at which the upward traversal was stopped has been assigned a deletion-candidate label, and that said parent node may be the starting node for another upward tree traversal for determining if all direct and indirect parent nodes of said starting node are deletion candidate nodes and can safely be deleted without risking that CIs 112 in the CMDB 108 become inconsistent. In many cases it may not be necessary to visit all nodes of a tree, thereby saving processing resources.

In some embodiments of the present invention, each already examined node is marked as "visited". Whenever the upward or downward traversal, starting from a particular starting node, is terminated and another path starting from another starting node is traversed in a particular direction, the traversal may be skipped immediately upon determining that a current node was already "visited". This may prohibit traversing and evaluating a node multiple times in response to the trigger signal.

In another embodiment of the present invention, the traversing of the directed graph includes selecting one of the nodes having been assigned the deletion-candidate label as a starting node and traversing the directed graph from that starting node, to all of the nodes which are a direct or indirect parent node of the determined starting node. Each traversed node is evaluated in order to determine whether the node has been assigned a deletion-candidate label.

In yet another embodiment, in response to the trigger signal (i.e., step 304), an arbitrary one of the nodes having been assigned a deletion-candidate label may be used as a starting node for the directed graph traversal, whereby each evaluated node is marked as a "visited" node. After having finished the traversal for the determined starting node, an arbitrary (e.g., randomly selected) other one of the nodes which have been assigned the deletion-candidate label, and which have not been assigned the "visited" label are used as a starting node for the next traversal until no "unvisited" nodes having been assigned the deletion-candidate label exist.

In other embodiments, a user interface, e.g., a graphical user interface, may be presented by the CMDB 108 to a user for enabling the user to select one or more of the nodes having been assigned a deletion-candidate label as a starting node for the directed graph traversal.

In another embodiment, the traversal of the directed graph includes starting the graph traversal at a starting node (which may be a user-selected or randomly chosen deletion-candidate node) and traversing all paths in the graph that cross said starting node in both directions, upwards and downwards, until a leaf node, a root node (in case the graph is a tree) or an already "visited" node is reached. This may ensure that all CIs 112 which are outdated as a consequence of a failure of a module, from which their respective source module directly or indirectly depends, are identified and deleted. This may also ensure that in the case that one or more CIs 112 are identified which are direct or indirect parent nodes of the determined starting node and that have not been assigned said deletion-candidate label, said starting node will not be deleted, because the outdated configuration data of the starting node is caused by a broken data connection, not by a failure of a respective module.

In step 312, CMDB 108 determines whether all direct and indirect parent nodes have a deletion-candidate label. In this exemplary embodiment, CMDB 108 uses the tree traversal techniques described above (step 310) in order to determine whether each direct and indirect node of a determined starting node have the deletion-candidate label.

If, in step 312, CMDB 108 determines that all of the direct and indirect parent nodes have the deletion-candidate label, then, in step 314, the starting node, as well as all of its direct and indirect parent nodes are deleted. Only if this is the case, said node and all of its direct and indirect parent nodes are selectively deleted from the graph. In some embodiments, the topology of the directed graph reflects dependencies between the modules such that each of the nodes of the directed graph acting as a direct or indirect parent node of at least another one of the nodes comprises configuration data of a module whose existence, installation, or instantiation depends on features of another module, where the other module acts as a source of the configuration data of at least one node. These features may ensure that each parent-child relationship in the directed graph reflects a real dependency of a first module and a second module, the second module acting as a source of the configuration data of a second CI acting as the parent node, and the first module acting as a source of the configuration data of a first CI being an indirect or direct child node of the second CI. Thus, in the case that current configuration data for a module being the data source of a "parent node" exists, it can be safely assumed that also all modules acting as data sources of the configuration data of the direct and indirect child nodes of said parent node are fully operative, otherwise, it would not be possible that current configuration data is available for the (dependent) second node (the parent node).

If, in step 312, CMDB 108 determines that not all of the direct and indirect parent nodes have the deletion-candidate label, then, in step 316, all of the nodes are kept. If, in particular, one of the direct or indirect parent nodes of the starting node has not been assigned a deletion-candidate label, the deletion-candidate label of the starting node is removed. This may have the advantage that deletion-candidate labels having been assigned to a particular CI 112 and node, although the assigned module is fully operative, are automatically removed. Thus, in the case that the data connection to the module acting as the configuration data source is interrupted, but the respective module is still fully operative and hosts one or more dependent modules, the erroneous delete-candidate label is removed to prohibit inconsistencies in the dependency directed graph and/or to reduce the number of potential starting nodes for a later directed graph traversal for deleting outdated nodes.

In other embodiments, instead of deleting the starting node and corresponding CI 112, an error message may be output and/or an automated error correction routine may be executed for notifying a user that a data connection between CMDB 108 and the module acting as the data source for the starting node may be interrupted, and/or for automatically re-establishing the data connection (e.g., by automatically restarting a respective provider unit, re-opening a network connection, and the like).

In this exemplary embodiment, after having removed the identified CIs 112, a graphical representation of the graph of CIs 112 and respective modules 116-124 is created and communicated via a network to client system 134. The graphical representation may consume only a very limited amount of the available network capacity, because the identified, outdated configuration items are deleted from CMDB 108. In some embodiments, a visual representation of the directed graph and its nodes is displayed on a display screen. For example, the display screen may have very limited size, and may be a screen of a hand-held battery-powered mobile device, e.g., a cellular phone. The deletion of the outdated nodes results in a condensed display of the configuration data of the modules. As a consequence, scrolling movements on the display are avoided and battery energy may be saved.

In addition, the graphical representation can comprise error messages and other information enabling a user or a software application to identify (a) modules from which no configuration data can be received because the module is not operative (all modules which depend on said module are also not operative) and/or to identify (b) modules which are fully operative (because current configuration data was received from at least one module which depends on said module), but which are not able to communicate current configuration data to the CMDB 108, e.g., due to a broken data connection or an unavailable provider unit. In the case of (a), the un-operative module and all other un-operative modules from which it depends may be automatically restarted by a system management IT-framework while in the case of (b), it may be selected that only the respective provider unit is restarted automatically.

FIG. 4 depicts an example graph 400 of interconnected configuration items comprising configuration data of interdependent hardware, firmware, and software modules, in accordance with an embodiment of the present invention.

In the depicted example, the directed graph is a tree, but other topologies are possible. For example, in some embodiments, the directed graph may comprise cyclic dependencies in which two nodes may be connected by two edges having opposite direction, whereby each node acts both as a parent node and as a child node in respect to the connected node. Such a situation may, for example, occur for two application programs which have to interoperate in order to provide a particular function, e.g., one module that is responsible for calculating a statistical result on input data which requires a second module to act as a data provider and as a receiver of the calculation result. In such a situation, the CMDB may resolve such cyclic dependencies automatically during the traversal of the directed graph for avoiding visiting and evaluating a particular node multiple times.

In this exemplary embodiment, the first node is a direct child node of the second node in the directed graph, and one or more nodes of the graph have multiple direct parent nodes and/or multiple direct child nodes. In this exemplary embodiment, each of the edges connects a first node and a second node. Each edge is indicative of a dependency of a first module, whose configuration is determined by the configuration item acting as the first node, and a second module, whose configuration is determined by the configuration item acting as the second node. This dependency can be, for example, that the first module must have been installed before the second module can act as the source of the configuration data of the second node. For example, the first module may be an operating system such as Linux and the second module may be a Linux-based application program. The Linux-based application program can only be installed after a successful installation of the Linux OS.

In some embodiments of the present invention, a plurality of the configuration items respectively comprise, in their configuration data, a specification of a directed relation between one of the modules configured by the configuration data and another one of the modules. The directed graph is automatically generated by automatically extracting, for each of the configuration items, the directed edge connecting the configuration item to another configuration item. The extraction may be performed, for example, by the configuration database management system or a plug-in thereof. The extraction is performed by automatically identifying a first module type (e.g., Linux, Unix, Mac OS, Windows and a respective OS version number, a device type, such as non-volatile storage medium, memory, network card, etc., or the like). Further the extraction is performed by identifying a second module type, which acts as the configuration data source of the configuration item. The first and second module type are analyzed, during which the direction of an edge that shall connect the configuration item with the other configuration item is identified, where the direction determines whether the node is the parent node of the other node or vice versa. A directed edge is created, connecting the node and the other node. For example, in the case that the specification indicates that the first module is of type "operating system" and the second module is of type "application program (non-OS)", then the direction of an edge connecting the respective CIs of the first and second modules is automatically chosen, such that the second node (second module) is the (dependent) parent node of the first node (first module), because it is necessary that at first the OS is installed before an application program can run on it.

In some embodiments, the dependency can be, for example, that the first module must have been instantiated before the second module can act as the source of the configuration data of the second node. For example, the first module may be an application server application such as Apache and the second module may be an application program configured for being provided via the Apache application server. The Apache-based application program can only be installed or instantiated after a successful installation and instantiation of the Apache application server program.

In other embodiments, the dependency can be, for example, that the first module must be operatively coupled to the second module, and/or must fulfill a condition before the second module can act as the source of the configuration data of the second node. The criteria may be, for example, that the first module must support a communication protocol, must comprise a particular program library, have a particular version number, must have been instantiated under a user having some privileges, etc. Thus, the second module may depend on the existence, installation, and/or instantiation of the first module, and in this case the second node (which corresponds to the second module) logically depends on the first node (corresponding to the first module). The logical dependency may be reflected by a directed edge connecting the first node and the second node, the direction being indicative of the second node being a parent node of the first node.

In the exemplary embodiment, the nodes respectively each represent a configuration item 112. The nodes are connected by directed edges whose directions reflect the physical and/or logical dependencies of the modules 116-124 (FIG. 1) acting as configuration data sources of the respective configuration items. According to the depicted graph topology, each parent node may be connected with one or more child nodes, whereby the direction of the parent-child relationship indicates that the parent node depends on the correct functioning of each of its direct and indirect child nodes. This means that if a module reflected by any one of said direct or indirect child nodes fails, then said parent node will necessarily also fail and will not be able to act as a data source for the current configuration data.

If, for example, the current configuration data for a parent node, (e.g., NC1), is available, although the configuration data of a direct or indirect child node (e.g., ND1), is outdated and the respective node is marked as a deletion-candidate, CMDB 108 automatically determines that said parent node NC1 and also the deletion-candidate child node ND1 are fully operative. CMDB 108 determines that there may be a problem with the data connection between the module D1-DS 124 (FIG. 1), i.e., the data source of the deletion candidate node ND1, and the CMDB 108. The deletion of the CI 112 of the deletion candidate child node ND1 is prohibited.

Figure 5:
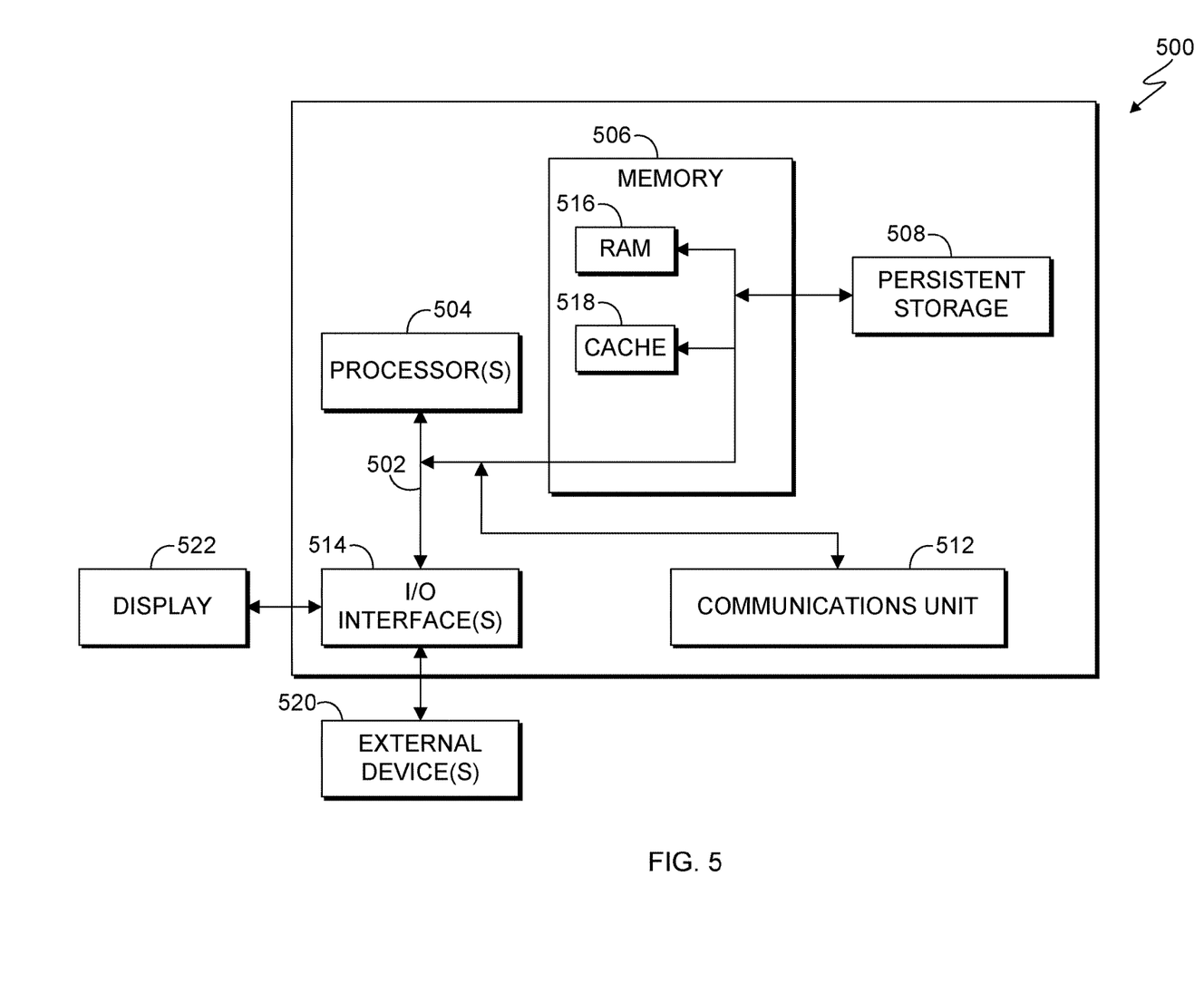
FIG. 5 is a block diagram of internal and external components of a computing device, in accordance with an embodiment of the present invention.

FIG. 5 is a block diagram of internal and external components of a computing device 500, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computing device 500 includes communications fabric 502, which provides for communications between one or more processors 504, memory 506, persistent storage 508, communications unit 512, and one or more input/output (I/O) interfaces 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 516 and cache memory 518. In general, memory 506 can include any suitable volatile or non-volatile computer readable storage media. Software is stored in persistent storage 508 for execution and/or access by one or more of the respective processors 504 via one or more memories of memory 506.

Persistent storage 508 may include, for example, a plurality of magnetic hard disk drives. Alternatively, or in addition to magnetic hard disk drives, persistent storage 508 can include one or more solid state hard drives, semiconductor storage devices, read-only memories (ROM), erasable programmable read-only memories (EPROM), flash memories, or any other computer readable storage media that is capable of storing program instructions or digital information.

The media used by persistent storage 508 can also be removable. For example, a removable hard drive can be used for persistent storage 508. Other examples include optical and magnetic disks, thumb drives, and smart cards that are inserted into a drive for transfer onto another computer readable storage medium that is also part of persistent storage 508.

Communications unit 512 provides for communications with other computer systems or devices via a network (e.g., network 210). In this exemplary embodiment, communications unit 512 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computing device 500 through communications unit 512 (e.g., via the Internet, a local area network or other wide area network). From communications unit 512, the software and data can be loaded onto persistent storage 508.

One or more I/O interfaces 514 allow for input and output of data with other devices that may be connected to computing device 500. For example, I/O interface 514 can provide a connection to one or more external devices 520 such as a keyboard, computer mouse, touch screen, virtual keyboard, touch pad, pointing device, or other human interface devices. External devices 520 can also include portable computer readable storage media such as, for example, thumb drives, portable optical or magnetic disks, and memory cards. I/O interface 514 also connects to display 522.

Display 522 provides a mechanism to display data to a user and can be, for example, a computer monitor. Display 522 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for operating a configuration management database (CMDB), the method comprising:
responsive to updating a configuration item in a configuration management database, receiving, by one or more processors, an indication to delete the configuration item;
responsive to receiving the indication to delete the configuration item, determining, by one or more processors, whether an age of the configuration item is greater than a threshold, wherein the threshold comprises a difference between a current time and a last update time of the configuration item;
responsive to determining that the age of the configuration item is greater than the threshold, assigning, by one or more processors, the configuration item a deletion-candidate label;
identifying, by one or more processors, a set of configuration items associated with a set of nodes of a directed graph, wherein the set of nodes of the directed graph are assigned the deletion-candidate label; and deleting, by one or more processors, the set of identified configuration items assigned the deletion-candidate label.

2. The method of claim 1, further comprising:
removing, by one or more processors, the deletion-candidate label from the set of nodes having at least one direct or one indirect parent node, which does not have the deletion-candidate label.

3. The method of claim 1, wherein the set of nodes of the directed graph comprise:
a first node associated with a first module and a second node associated with a second module, wherein the first node is connected to the second node by an edge, and wherein the edge is associated with a dependency between the first module and the second module.

4. The method of claim 1, further comprising:
traversing, by one or more processors, the directed graph, wherein traversing the directed graph comprises:
selecting, by one or more processors, a starting node, wherein the starting node comprises at least one node from the set of nodes assigned the deletion-candidate label;
determining, by one or more processors, whether each node from the starting node to a root node are assigned the deletion-candidate label; and
in response to determining that each node from the starting node to the root node is assigned the deletion-candidate label, deleting, by one or processors, each node from the starting node to the root node.

5. The method of claim 4, further comprising:
in response to determining that at least one node from the starting node to the root node is not assigned the deletion-candidate label, skipping, by one or more processors, the traversing of the directed graph for the starting node; and
selecting, by one or more processors, a second starting node for traversing the directed graph.

6. The method of claim 1, further comprising:
extracting, by one or more processors, for the configuration item, a directed edge connecting the configuration item to a second configuration item, comprising:
identifying, by one or more processors, a first module type configured by the configuration item;
identifying, by one or more processors, a second module type configured by the second configuration item; and
determining, by one or more processors, a direction of the directed edge, based, at least in part, on a directed relation in a specification of the configuration item.

7. The method of claim 1, further comprising:
receiving, by one or more processors, current configuration data from a set of modules, wherein receiving the current configuration data from a first module of the set of modules is independent from receiving the current configuration data from a second module of the set of modules; and
responsive to receiving the current configuration data from a set of modules, updating, by one or more processors, the configuration item associated with the configuration data from the set of modules, wherein updating the configuration item associated with the configuration data from the set of modules comprises updating the last update time of the configuration item.

8. A computer program product for operating a configuration management database (CMDB), the computer program product comprising:
a computer readable storage medium, and
program instructions stored on the computer readable storage medium, the program instructions comprising:
program instructions, responsive to program instructions to update a configuration item in a configuration management database, to receive an indication to delete the configuration item;
program instructions to, responsive to receiving the indication to delete the configuration item, determine whether an age of the configuration item is greater than a threshold, wherein the threshold comprises a difference between a current time and a last update time of the configuration item;
program instructions to, responsive to determining that the age of the configuration item is greater than the threshold, assign the configuration item a deletion-candidate label;
program instruction to identify a set of configuration items associated with a set of nodes of a directed graph, wherein the set of nodes of the directed graph are assigned the deletion-candidate label; and
program instructions to delete the set of identified configuration items assigned the deletion-candidate label.

9. The computer program product of claim 8, further comprising:
program instructions to remove the deletion-candidate label from the set of nodes having at least one direct or at least one indirect parent node, which does not have the deletion-candidate label.

10. The computer program product of claim 8, wherein the set of nodes of the directed graph comprise:
a first node associated with a first module and a second node associated with a second module, wherein the first node is connected to the second node by an edge, and wherein the edge is associated with a dependency between the first module and the second module.

11. The computer program product of claim 8, further comprising:
program instructions to traverse the directed graph, wherein the program instructions to traverse the directed graph comprise:
program instructions to select a starting node, wherein the starting node comprises at least one node from the set of nodes assigned the deletion-candidate label;
program instructions to determine whether each node from the starting node to a root node are assigned the deletion-candidate label; and
program instructions to, in response to determining that each node from the starting node to the root node is assigned the deletion-candidate label, delete each node from the starting node to the root node.

12. The computer program product of claim 11, further comprising:
program instructions to, in response to determining that at least one node from the starting node to the root node is not assigned the deletion-candidate label, skip the traversing of the directed graph for the starting node; and
program instructions to select a second starting node for traversing the directed graph.

13. The computer program product of claim 8, further comprising:
program instructions to extract, for the configuration item, a directed edge connecting the configuration item to a second configuration item, comprising:

program instructions to identify a first module type configured by the configuration item;
program instructions to identify a second module type configured by the second configuration item; and
program instructions to determine a direction of the directed edge, based, at least in part, on a directed relation in a specification of the configuration item.

14. The computer program product of claim 8, further comprising:
program instructions to receive current configuration data from a set of modules, wherein program instructions to receive the current configuration data from a first module of the set of modules is independent from program instructions to receive the current configuration data from a second module of the set of modules; and
program instructions to, responsive to receiving the current configuration data from a set of modules, update the configuration item associated with the configuration data from the set of modules, wherein the program instructions to update the configuration item associated with the configuration data from the set of modules comprise program instructions to update the last update time of the configuration item.

15. A computer system for operating a configuration management database (CMDB), the computer system comprising:
a plurality of configuration items, wherein each of the plurality of configuration items comprises configuration data for a module, and wherein the module comprises at least one of: a hardware module, a firmware module, and a software module;
one or more computer processors;
one or more computer readable storage media; and
program instructions stored on the one or more computer readable storage media for execution by at least one of the one or more computer processors, the program instructions comprising:
program instructions, responsive to program instructions to update a configuration item in a configuration management database, to receive an indication to delete the configuration item;
program instructions to, responsive to receiving the indication to delete the configuration item, determine whether an age of the configuration item is greater than a threshold, wherein the threshold comprises a difference between a current time and a last update time of the configuration item;
program instructions to, responsive to determining that the age of the configuration item is greater than the threshold, assign the configuration item a deletion-candidate label;
program instruction to identify a set of configuration items associated with a set of nodes of a directed graph, wherein the set of nodes of the directed graph are assigned the deletion-candidate label; and
program instructions to delete the set of identified configuration items assigned the deletion-candidate label.

16. The computer system of claim 15, further comprising:
program instructions to remove the deletion-candidate label from the set of nodes having at least one direct or at least one indirect parent node, which does not have the deletion-candidate label.

17. The computer system of claim 15, wherein the set of nodes of the directed graph comprise:
a first node associated with a first module and a second node associated with a second module, wherein the first node is connected to the second node by an edge, and wherein the edge is associated with a dependency between the first module and the second module.

18. The computer system of claim 15, further comprising:
program instructions to traverse the directed graph, wherein the program instructions to traverse the directed graph comprise:
program instructions to select a starting node, wherein the starting node comprises at least one node from the set of nodes assigned the deletion-candidate label;
program instructions to determine whether each node from the starting node to a root node are assigned the deletion-candidate label; and
program instructions to, in response to determining that each node from the starting node to the root node is assigned the deletion-candidate label, delete each node from the starting node to the root node.

19. The computer system of claim 15, wherein the module is one of: a hypervisor; a virtual machine; an operating system; an application program; a web server program or an application server program; a router; a network interface; and a firewall.

20. The computer system of claim 15, further comprising:
program instructions to extract, for the configuration item, a directed edge connecting the configuration item to a second configuration item, comprising:
program instructions to identify a first module type configured by the configuration item;
program instructions to identify a second module type configured by the second configuration item; and
program instructions to determine a direction of the directed edge, based, at least in part, on a directed relation in a specification of the configuration item.

* * * * *